United States Patent [19]

Smith

[11] Patent Number: 4,492,839

[45] Date of Patent: Jan. 8, 1985

[54] THERMAL TREATMENT APPARATUS

[76] Inventor: Donald P. Smith, P.O. Box 340530, Dallas, Tex. 75234

[21] Appl. No.: 407,943

[22] Filed: Aug. 13, 1982

Related U.S. Application Data

[60] Continuation-in-part of Ser. No. 177,174, Aug. 11, 1980, abandoned, and Ser. No. 341,640, Jan. 22, 1982, which is a continuation-in-part of Ser. No. 286,060, Jul. 22, 1981, Pat. No. 4,409,453, which is a continuation of Ser. No. 20,968, Mar. 16, 1979, abandoned, which is a division of Ser. No. 687,982, May 19, 1976, Pat. No. 4,154,861, said Ser. No. 177,174, is a continuation of Ser. No. 38,129, May 11, 1979, abandoned.

[51] Int. Cl.³ ............................................. H05B 9/06
[52] U.S. Cl. ..................... 219/10.55 R; 219/10.55 F; 126/21 A
[58] Field of Search ................. 219/10.55 R, 10.55 F, 219/400; 126/21 A; 426/235, 243

[56] References Cited

U.S. PATENT DOCUMENTS

| | | | |
|---|---|---|---|
| 3,027,442 | 3/1962 | Verstraten | 219/10.55 A |
| 3,494,724 | 2/1970 | Gray | 219/10.55 R |
| 3,774,003 | 11/1973 | Kaufman, Jr. et al. | 219/10.55 A |
| 3,884,213 | 5/1975 | Smith | 126/21 A |
| 3,889,009 | 6/1975 | Lipoma | 219/10.55 A |
| 4,154,861 | 5/1979 | Smith | 219/10.55 E X |
| 4,289,792 | 9/1981 | Smith | 219/10.55 R X |
| 4,338,911 | 7/1982 | Smith | 126/21 A |
| 4,365,422 | 12/1982 | Kawaguchi | 219/10.55 R |
| 4,409,453 | 10/1983 | Smith | 219/10.55 A |

FOREIGN PATENT DOCUMENTS 49-129241 12/1974 Japan.

Primary Examiner—C. L. Albritton
Assistant Examiner—M. M. Lateef
Attorney, Agent, or Firm—Crutsinger, Booth & Ross

[57] ABSTRACT

Apparatus and method for imparting thermal energy to food products, the apparatus comprising a heating section with microwave generating apparatus and impingement heating apparatus for either sequentially or sequentially and simultaneously thermally treating the interior and surface portions of food products and further comprising apparatus for controlling the moisture content of the impingement air jets within the heating section so as to avoid localized overheating and overbrowning of the food products by the microwaves.

14 Claims, 5 Drawing Figures

THERMAL TREATMENT APPARATUS

CROSS-REFERENCE TO RELATED APPLICATIONS

This application is a continuation-in-part of copending U.S. patent application Ser. No. 06/177,174, filed Aug. 11, 1980, now abandoned, and Ser. No. 06/341,640, filed Jan. 22, 1982. Application Ser. No. 06/177,174 is in turn a continuation of application Ser. No. 06/038,129, filed May 11, 1979, now abandoned. Application Ser. No. 06/341,640 is a continuation-in-part of application Ser. No. 06/286,060, filed July 22, 1981, now issued as U.S. Pat. No. 4,409,453, which is a continuation of application Ser. No. 020,968, filed Mar. 16, 1979, now abandoned, which is in turn a divisional of application Ser. No. 687,982, filed May 19, 1976, now issued as U.S. Pat. No. 4,154,861.

TECHNICAL FIELD

This invention relates to ovens, and more particularly, to large conveyorized ovens suitable for commercial or institutional use. One aspect of the invention relates to ovens wherein thermal energy is imparted to food products through the sequential or combined use of microwave and impingement heating zones. A further aspect of the invention relates to an apparatus and method for heating food products whereby the interior portions of such food products are raised to a desired temperature primarily by microwave heating while the temperature and moisture content at the surface of such food products are controlled by impingement heating while regulating the equilibrium relative humidity.

BACKGROUND ART

It is well known that the texture, flavor, odor and appearance of many food products are significantly affected by the temperatures at which such products are prepared, stored and served. It has also been appreciated that the moisture content, another important factor in the overall desirability or acceptability of food products, is greatly affected by the thermal treatment accorded to such products. Many complex chemical and physical changes in food products are brought about by the manner in which their temperature and moisture content are regulated.

Because of these and other considerations, numerous different apparatus and methods for heating and cooling food products have been disclosed in the prior art. Thus, for example, convection ovens, infrared ovens, microwave ovens and impingement heating ovens have all been utilized, either alone or in combination, to impart thermal energy to food products. Particularly desirable and effective apparatus and methods for imparting thermal energy to food products have previously been disclosed, for example, in U.S. Pat. Nos. 3,884,213 and 4,154,861.

The apparatus and methods disclosed in the foregoing patents employ columnated jets of air or other gaseous fluid to create discrete areas of very high heat transfer on the surface of a food product. This high heat transfer accomplishes the advantageous effects of crisping, browning, searing, chilling or freezing in those localized areas where the jets impinge against the surface of the product. When the jets are of proper size, spacing, temperature, velocity and direction, very desirable results are obtained. Experience has shown that the use of hot air jets impinging substantially perpendicularly to the surface of the product achieves heat transfer rates two to ten times greater than the heat transfer from the same volume of air moving parallel to the product's surface. This very rapid heat transfer is desirable to initiate rapid cooking, baking, cooling or freezing. Furthermore, when the food products are passed beneath the jets, these effects are spread evenly over the food surface.

U.S. Pat. No. 3,884,213 further discloses an apparatus for heating both the surface and interior portions of food products through the use of microwave radiation in combination with impingement heating. When microwave energy is employed in combination with the columnated jets of heated gas impinging on the surface of the food products, internal and external heating can be accomplished simultaneously. However, the apparatus and methods previously disclosed in the prior art have been found to have certain disadvantages which are overcome through use of the apparatus and method disclosed herein.

SUMMARY OF THE INVENTION

According to the present invention, a thermal treatment apparatus is provided for rapidly and efficiently imparting thermal energy to food products without localized overheating, overbrowning or drying out the surface portions of those products. A primary object of the invention is to provide an apparatus suitable for commercial or institutional use that imparts thermal energy to food products by the sequential application of microwave and impingement heating. Another object of the invention is to provide a conveyorized oven utilizing both microwave and impingement heating, and having means for controlling the moisture content of the recirculating heated gas, or the equilibrium relative humidity at the surface of the food product.

According to one object of the invention, an apparatus is provided comprising a plurality of spaced apart jet fingers adapted to direct columnated jets of heated gas against the surface of a food product moving in relation thereto in such manner that the columnated jets contact the surface of the food product in substantially perpendicular relation, and further comprising at least one microwave generating device adapted to impart thermal energy to the interior portions of the food products either before, after or during the time that the food products are subjected to impingement heating.

According to a further object of the invention, a conveyorized oven is provided that comprises a plurality of microwave generating devices and means for separately controlling the thermal energy transfer rate to the food product from each such device.

According to a further object of the invention, a conveyorized oven is provided that comprises a plurality of spaced apart jet fingers and means for separately controlling the thermal energy transfer rate to the food product through each jet finger.

According to a further object of the invention, an apparatus is provided whereby at least a portion of the temperature controlled gaseous fluid directed against the surface of the food product during impingement heating is recirculated through the walls of the waveguide utilized to direct microwave radiation from the microwave radiation source to the food product.

According to a further object of the invention, an apparatus for heating food products by the sequential use of microwave and impingement heating is provided which further comprises a vent system for withdrawing vapors containing excess moisture, smoke, grease, fats, oxidation by-products and other entrained or particulate matter from the oven.

According to a further object of the invention, a conveyorized oven is provided which further comprises removable sleeve members in the inlet and outlet sections of the oven to facilitate cleaning.

According to a further object of the invention, a conveyorized oven is provided that comprises microwave heating means, impingement heating means, and means for controlling the moisture content of the heated gas that is recirculated through the impingement heating means.

According to another embodiment of the invention, a method for imparting thermal energy to food products is disclosed whereby the food products are sequentially subjected to microwave and impingement heating while being transported in a single direction that is substantially perpendicular to the direction in which the thermal energy is being applied to such food products.

Other and further objects or improvements of the invention will become apparent upon reading the detailed description which follows in conjunction with the accompanying drawings.

BRIEF DESCRIPTION OF THE DRAWING

The present invention is further described in relation to the accompanying drawings, wherein.

DETAILED DESCRIPTION OF THE INVENTION

Figure 1:
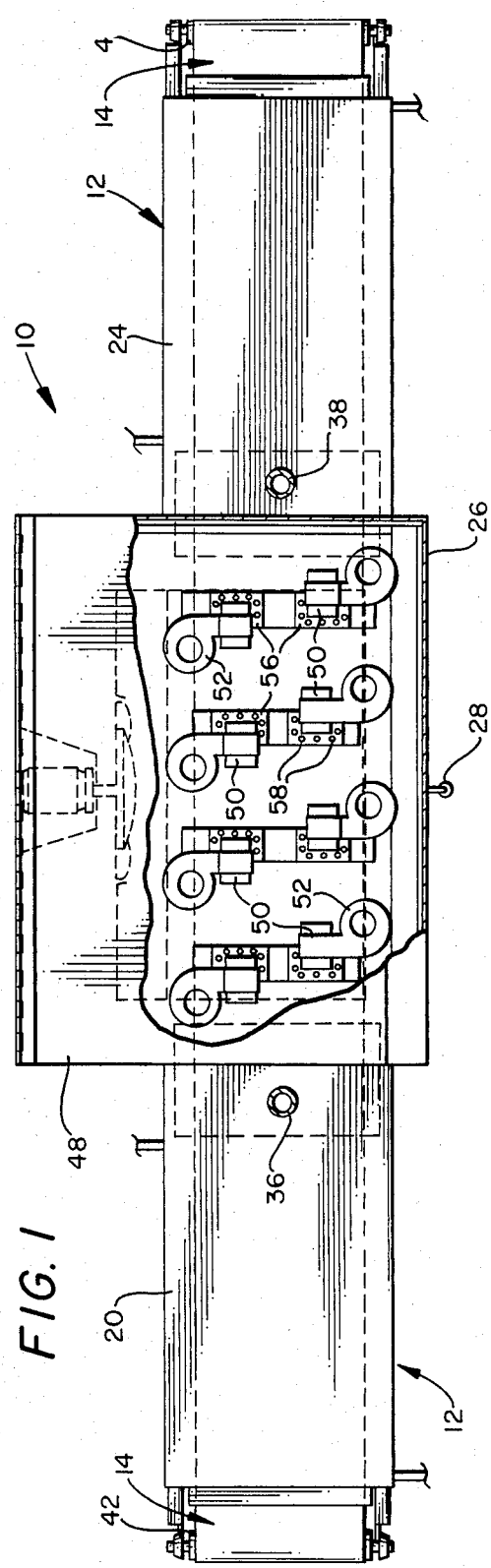
FIG. 1 depicts a plan view, partially broken away, of a preferred embodiment of the apparatus of the invention.
Figure 2:
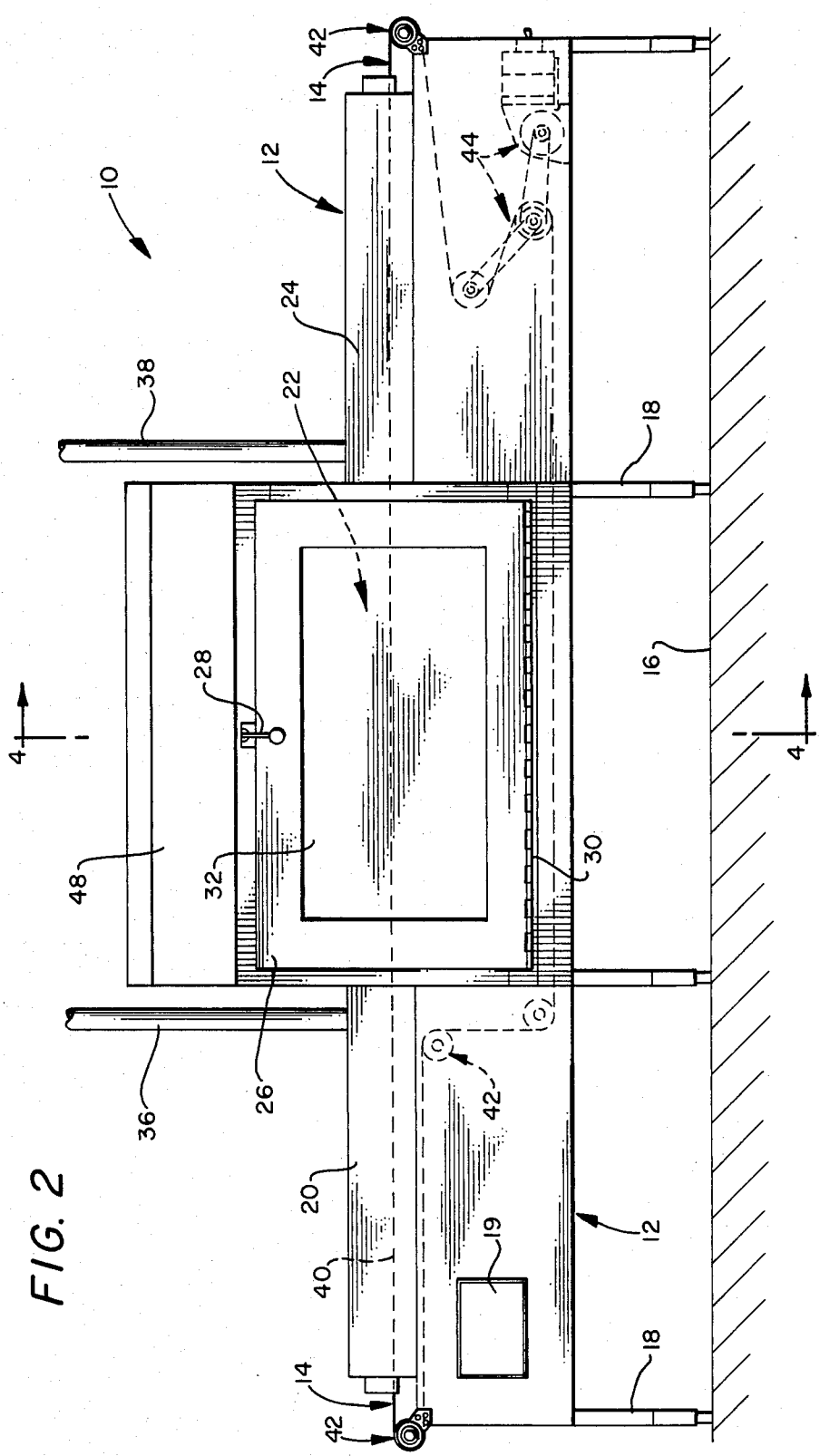
FIG. 2 depicts a front elevation view of the apparatus shown in FIG. 1.

Referring to FIGS. 1 and 2, thermal treatment apparatus 10 is preferably a tunnel oven suitable for commercial, industrial or institutional use, and comprises cabinet 12 having conveyor mechanism 14 disposed therein for transporting food products through the oven.

Figure 3:
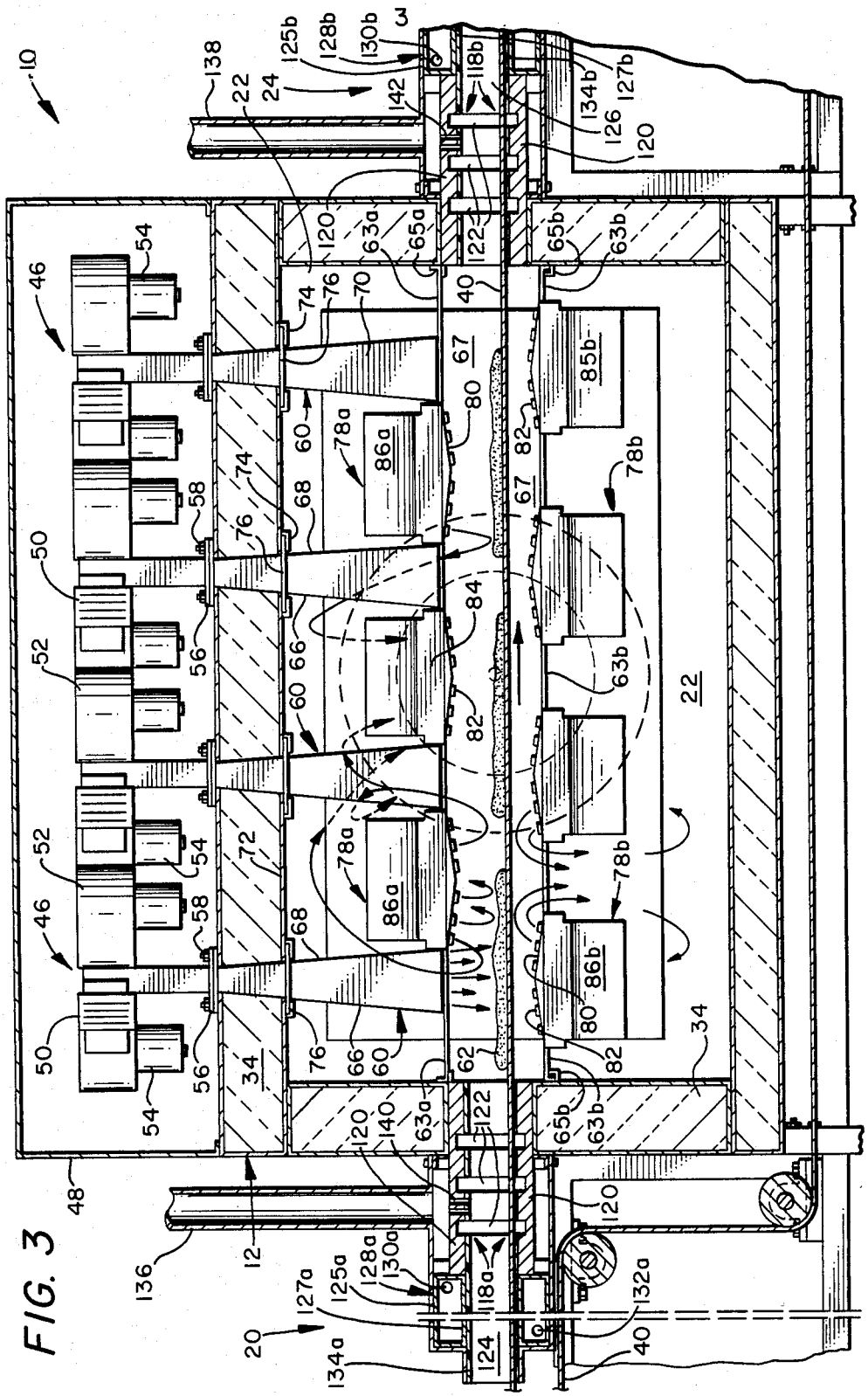
FIG. 3 depicts an enlarged sectional front elevation view, partially broken away, of the apparatus shown in FIGS. 1 and 2.
Figure 4:
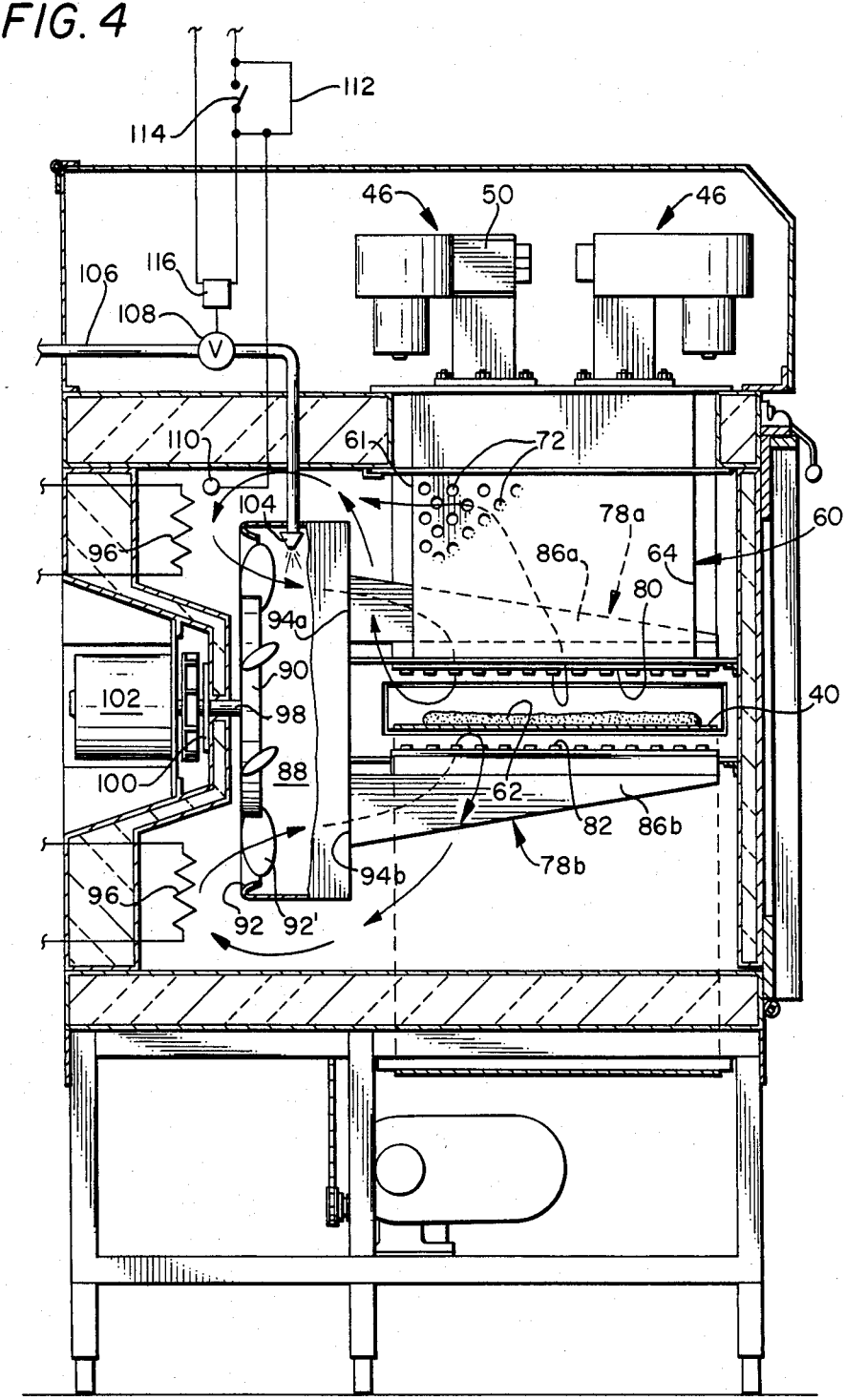
FIG. 4 depicts an enlarged sectional side elevation view, partially broken away, of the subject apparatus, taken along line 4—4 of FIG. 2.

Cabinet 12 is preferably constructed of a metallic material such as stainless steel and is supported at a desired height above the surface of floor 16 by legs 18. Cabinet 12 desirably comprises control panel 19, inlet section 20, heating section 22 and outlet section 24. Cabinet 12 can be adapted by means of door 26, being further equipped with latch 28 and hinge 30, to provide access to the interior of heating section 22 of thermal treatment apparatus 10. According to one embodiment, door 26 further comprises window 32 to permit visual observation of food products passing through heating section 22, provided that a suitable microwave screening material is employed therewith. A satisfactory screening material is a perforated metal grid as may be found in conventional, commercially available microwave ovens. As shown in FIGS. 3 and 4, heating section 22 of cabinet 12 is preferably of double wall construction, with insulating material 34 disposed between the interior and exterior walls thereof to aid in preventing thermal energy loss.

Inlet section 20 and outlet section 24 are preferably further adapted by means of vent pipes 36, 38, respectively to withdraw vapors containing excess moisture, smoke, grease, fats, oxidation by-products, and other entrained or particulate matter from thermal treatment apparatus 10, as will be further discussed below.

Conveyor mechanism 14 preferably comprises a belt or web 40 adapted by means of pulleys 42 and drive mechanism 44 to be continuously recirculated through heating section 22 of thermal treatment apparatus 10. Web 40 is desirably constructed of a material that is durable enough to withstand prolonged continuous use, yet will permit the transmission of microwave and thermal energy to the food products supported thereon. According to a preferred embodiment of the invention, web 40 is made from flexible fiberglass mesh that has been coated with polytetrafluoroethylene Although this description is primarily directed to an embodiment employing a linear conveyor means, it should be understood and appreciated that the apparatus and methods disclosed herein can be readily adapted to a configuration whereby the microwave heating means and impingement heating means are squentially utilized to thermally treat food products transported on a rotating conveyor means.

Referring to FIGS. 1, 3 and 4, a plurality of microwave heating units 46 are preferably disposed inside upper housing 48 above that portion of cabinet 12 surrounding heating section 22 of thermal treatment apparatus 10. Microwave heating units 46 each preferably further comprise a magnetron 50 for generating microwave energy suitable for use in cooking food products being transported through heating section 22 by conveyor means 14. It will be apparent to those of ordinary skill in the art upon reading the present disclosure that magnetrons 50 can comprise any of the many commercially available microwave generating devices which are suitable for use in cooking applications. One such microwave emitting apparatus is marketed by Litton under the trade designation L5001, as disclosed in co-pending patent application Ser. No. 06/177,174, filed Aug. 11, 1980, the contents of which are hereby incorporated by reference into this application.

Magnetrons 50 are preferably operatively coupled to fans or blowers 52, driven by motors 54, which provide cooling for the magnetrons. Although the accompanying drawings depict the use of a separate blower 52 for each magnetron 50, it is understood that any similarly effective means for dissipating heat from magnetrons 50 can also be used within the scope of the invention. According to a preferred embodiment of the invention, microwave heating units 46 are secured to the top wall of cabinet 12 of thermal treatment apparatus 10 above that portion of web 40 that is disposed within heating section 22. A satisfactory method for securing microwave heating units 46 to cabinet 12 is by means of flange plates 56 and bolts 58. As shown in FIGS. 3 and 4, microwave energy emitted by magnetrons 50 is desirably directed by waveguides 60 toward food products 62 being transported on web 40 through heating section 22 of thermal treatment apparatus 10.

Waveguides 60 preferably each comprise spaced apart, substantially vertical back and front walls 61, 64, respectively, and spaced apart, inclined sidewalls 66, 68, respectively, which cooperate to define a microwave transmission zone 70 having a rectangular horizontal cross-section that increases in area according to the distance from magnetrons 50. Back and front walls 61, 64 and sidewalls 66, 68 can be constructed of any material suitable for functioning as a waveguide for the microwave radiation, provided that the material can be adapted to permit heated gas from the jet fingers to be recirculated therethrough as described below, and further provided that the material can withstand the oven temperatures during prolonged periods of continuous use. According to a particularly preferred embodiment of the invention, the walls are fabricated from stainless steel sheeting, and are preferably further adapted by means of a plurality of evenly spaced holes 72 as shown in FIG. 4 to assist in recirculating the heated gas that is discharged from jet fingers 74. The diameter and spacing of openings 72 in the walls of waveguides 60 are desirably such that they will not detract from the function of the waveguides 60, which is to direct microwaves emitted by magnetrons 50 toward food products 62 being transported through heating zone 22 on web 40 of conveyor means 14. Satisfactory results have been achieved by utilizing walls fabricated from 18 gauge stainless steel with $\frac{1}{8}$ inch holes drilled on 3/16 inch centers.

The inclination of sidewalls 66, 68 is desirably such that microwaves emitted by magnetrons 50 are directed toward food products 62 passing thereunder. It will be appreciated by those of ordinary skill in the art that considerable information, including formulas for calculating hole diameter and spacing, and the applicable considerations in constructing waveguides for microwave radiation of various frequencies is readily available in the published literature. For example, these and other considerations are discussed in detail in HEATING WITH MICROWAVES, FUNDAMENTALS, COMPONENTS AND CIRCUIT TECHNIQUE by H. PUSCHNER (PHILIPS TECHNICAL LIBRARY 1966). As shown in FIG. 3, waveguides 60 can be suspended from top interior wall 72 of cabinet 12 by brackets 74 which cooperate with flanges 76 to provide the desired support.

Furthermore, it is also possible within the scope of the present invention to employ horizontally disposed waveguides that extend transversely across web 40 in parallel and spaced apart relation thereto. In such case, the magnetrons are desirably mounted at the rear of cabinet 12 in such manner that they do not interfere with the operation of the impingement heating means. Such waveguides are desirably adapted to receive microwave radiation from the magnetrons in a substantially horizontal direction and thereafter redirect it through appropriately designed slits in a substantially vertical direction toward food products transported on web 40. When waveguides having this configuration are utilized, the need for returning recirculated gas from the impingement heating means through the waveguides may be eliminated.

Also shown in FIG. 3 are screens 63a,b disposed above and below web 40, respectively, in heating section 22, which are intended to substantially confine microwave radiation emitted from waveguides 60 to cooking zone 67 around food products 62. Screens 63a,b are desirably employed in a preferred embodiment of the invention to reduce the scatter of microwave radiation within heating section 22 and thereby conserve the amount of radiation that must be generated by magnetrons 50 to achieve the desired degree of heating in food product 62. Screens 63a,b are preferably constructed from stainless steel sheeting in which holes have been drilled as for waveguides 60 to permit the recirculation of a portion of the heated gas that is discharged from jet fingers 78a,b. As shown in FIG. 3, the portions of screen 63a that would otherwise extend beneath waveguides 60 are cut out to permit the passage of microwaves to food products 62. Screens 63a,b are further adapted so as to fit closely around jet fingers 78a,b, but without interfering with the flow of the columnated jets of heated gas being discharged from the jet fingers before they impinge against the surface of food product 62. Screens 63a,b are maintained in substantially parallel relation to web 40 by brackets 65a,b, respectively, which are connected to the interior walls of cabinet 12 by welds, bolts, rivets or the like.

Although microwave heating units 46, waveguides 60 and microwave transmission zones 70 have been described herein in relation to a preferred embodiment wherein the microwave heating units 46 are all disposed above food products 62 being transported through heating section 22 of thermal treatment apparatus 10, it is understood that such microwave heating units can also be disposed beneath food products 62 so as to emit microwave radiation toward the lower surface of such food products where desired. Thus, depending upon the geometry and composition of food products 62, and further depending upon the size and spacing of magnetrons 50, it may be desirable to employ microwave heating units 46 and waveguides 60 either above or below, or both above and below, web 40. Furthermore, where microwave heating units 46 are employed both above and below web 40, the upper and lower units can be disposed in either directly opposed or staggered relationship to each other. Where a plurality of magnetrons 50 are employed in connection with the apparatus and method of the invention, it is possible through the use of one or more microprocessors to separately control the duration and intensity of the microwave radiation emitted by the magnetrons and thereby control the manner and extent to which food products 62 are subjected to the microwave radiation.

Referring to FIG. 3, a plurality of jet fingers 78a,b are preferably disposed within heating section 22 of thermal treatment apparatus 10 for directing columnated jets of a heated gas, preferably air, in substantially perpendicular relation against the surface of food product 62 being transported therebetween on web 40. As shown in FIG. 3, jet fingers 78a above web 40 are disposed in alternating relation with waveguides 60 so as to provide alternating microwave and impingement heating of food products 62 passing thereunder. Jet fingers 78b beneath web 40 are spaced apart and disposed in substantially staggered relation to jet fingers 78a. Depending upon the particular geometry and composition of food products 62 with which the subject apparatus is desired to be utilized, it is understood that jet fingers 78a,b could, within the scope of the present invention, be disposed in opposing relation above and below web 40, or could be disposed only above or below web 40, as desired.

Figure 5:
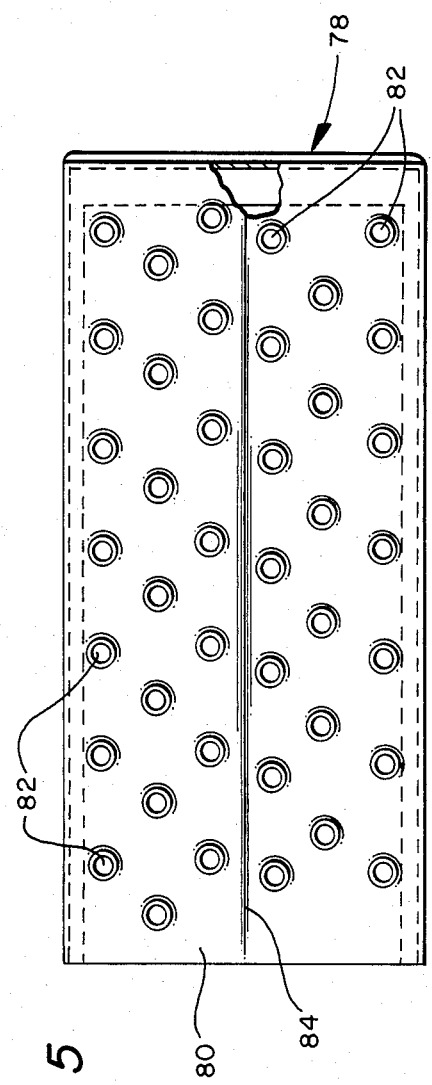
FIG. 5 depicts an enlarged plan view of a preferred embodiment of a jet finger as utilized in the apparatus of the invention.

The structure and function of jet fingers 78a,b suitable for use with the present invention are illustrated and described in considerable detail in copending application Ser. No. 06/341,640, filed Jan. 22, 1982, which is incorporated by reference herein. Nevertheless, jet fingers 78a,b and the manner in which they function as a portion of the impingement heating apparatus of the invention are further described in relation to FIGS. 3-5 below.

Jet fingers 78a,b preferably comprise plate 80 having a plurality of spaced apart orifices 82 disposed therein. As shown in FIG. 3, the left and right portions of plate 80 are desirably inclined as they extend outwardly from center line 84 to assist in slightly diffusing the columnated jets of heated gas passing through orifices 82 prior to contacting the surface of food products 62. In a particularly preferred embodiment of the invention, the left and right halves of plate 80 are desirably inclined about 2½° from a horizontal plane intersecting center line 84. A columnating plate (not shown) comprising orifices 82 in substantially concentrically aligned with orifices 82 in plate 80 is desirably employed in combination with plate 80 in order to produce the columnated jets of heated gas that impinge on the upper and lower surfaces of food products 62. Without the use of a columnating means as disclosed in applicant's aforementioned copending application, the heated gas being discharged from orifices 82 can diffuse too rapidly before impinging against the surface of food products 62 being transported on web 40 through heating section 22.

Upper and lower jet fingers 78a,b preferably further comprise tapered ducts 86a,b which provide fluid communication between orifices 82 in plate 80 and plenum 88. Jet fingers 78a,b and plenum 88 are preferably constructed from a metallic sheet material such as stainless steel or aluminized steel, and are disposed inside cabinet 12 and secured to the interior walls by suitable mounting brackets, or the like. Plenum 88 preferably surrounds impeller means 90 and communicates through inlet port 92 and outlet ports 94a,b with tapered ducts 86a,b, respectively. Where desired, dampers can also be disposed in outlet ports 94a,b to control the flow of heated air from plenum 88 into each of jet fingers 78a,b. Such dampers can either be manually operated or motor driven, and in the latter case, can be controlled or sequenced by a microprocessor either alone, or in combination with each other, or in combination with magnetrons 50.

The vertical spacing between upper and lower jet fingers 78a,b is preferably adequate to permit the unimpeded passage of food products 62 therebetween. The preferred spacing between jet fingers 78a,b can also depend on the diameter and relative spacing of orifices 82 in plates 80. The lateral spacing between jet fingers can vary in accordance with oven length, waveguide width, cooking time, conveyor speed, and other related factors. It is understood, of course, that the overall thermal energy transfer rate of the subject apparatus depends upon the number, design and spacing of both the microwave and impingement heating means; the length and speed of the conveyor; the temperature and moisture content of the recirculated gas, and the composition, geometry and spacing of the food products. As used herein, the term "thermal energy transfer rate" is understood to encompass the direct transfer of thermal energy to or from a food product across a temperature gradient, the impartation of thermal energy to a food product through the use of a source of electromagnetic radiation, and the transfer of thermal energy to or from a food product through the evaporation or condensation of water, within any specified time interval.

As previously mentioned, the spacing and diameter of holes 72 in waveguides 60 is preferably sufficient to avoid restricting the flow of gas discharged from orifices 82 and rebounding off the surface of food products 62 as it passes through holes 72 while returning to inlet port 92 of plenum 88. Where jet fingers 78a are disposed between waveguides 60, at least a portion of the gas discharged through orifices 82 in plate 80 is recirculated upward through holes 72 before reentering plenum 88 through inlet port 92. Where waveguides 60 are not disposed between jet fingers 78b, the gas discharged through orifices 82 can pass between adjacent jet fingers, behind plenum 88, and into inlet port 92.

According to one embodiment of the invention, thermal energy is imparted to the gaseous fluid being recirculated through plenum 88 by heating elements 96 disposed behind plenum 88 in heating section 22. Heating elements 96 preferably comprise electrical resistance heating elements, although gas fired burners, oil burners, or the like can also be employed within the scope of the invention. Although not shown in FIG. 4, it will be appreciated by those of ordinary skill in the art that a fresh air inlet source can also be incorporated within the apparatus of the invention, provided that adequate shielding is included to prevent undesirable losses of microwave radiation.

Referring to FIG. 4, impeller 90 is connected to shaft 98 which is rotatably mounted in bearing 100 and driven by motor 102. Motor 102 is in turn desirably mounted in or on the rear wall of cabinet 12. Alternatively, shaft 98 can be rotated by means of a pulley and belt connected to a remotely positioned motor.

As shown in FIG. 4, the apparatus of the invention preferably comprises means for controlling the moisture content of the gas being recirculated through heating section 22. Nozzle 104 disposed within plenum 88 communicates through water supply line 106 with an external source (not shown). Valve 108 is disposed in water supply line 106 to control the flow of water from the external source to nozzle 104 in plenum 88. Sensor 110 is preferably disposed within heating section 22 near plenum inlet 92 for the purpose of monitoring the moisture content of the gas being recirculated from jet fingers 78a,b. Sensor 110 can be selected from the many conventional, commercially available sensing devices that are adapted to monitor changes in humidity and temperature. Such devices typically comprise a water absorptive wick portion in combination with a temperature sensing portion which can comprise a thermistor, thermocouple, thermometer, or the like. A satisfactory temperature sensing device is a platinum resistance pyrometer manufactured by Chromalox Industrial Heating Products of Pittsburgh, Pa. Sensor 110 is operatively coupled to relay 112, which is calibrated to open and close in accordance with predetermined incremental changes in humidity and temperature. Relay 112 is operatively connected through switch 114 to solenoid 166, which controls valve 108 to further control the flow of water through water supply line 106 to nozzle 104. Thus, when the moisture content of the gas being recirculated through plenum 88 reaches a minimum desired level, sensor 110 triggers relay 112, causing a fine spray of water to be injected into plenum 88 through nozzle 104. As will be apparent to those of ordinary skill in the art upon reading the present disclosure, many other means for controlling the moisture content of the atmosphere within heating section 22 can also be utilized within the scope of the invention.

Referring again to FIG. 3, inlet section 20 and outlet section 24 further comprise choke seals 118a,b for controlling the loss of microwave radiation from heating section 22. Because thermal treatment apparatus 10 is adapted by conveyor means 14 to continuously transport food products 62 through heating section 22, choke seals 118a,b are designed to permit the passage of food products therethrough while effectively controlling microwave radiation losses. Choke seals 118a,b function as induced restraints to restrict the travel of the electromagnetic waves being radiated outward from heating section 22. Choke seals 118a,b preferably comprise spaced apart aluminum plate portions 120 having disposed therebetween and in substantially perpendicular relation thereto a plurality of spaced apart rings 122 extending around the periphery of tunnel sections 124, 126 to permit the ingress and egress of food products 62 while setting up "blocking waves" that reflect or otherwise substantially impede the passage of microwave radiation. The physical parameters and materials needed to design and build an effective induced restraint or choke seal are well known in the art (as disclosed, for example, in the Puschner volume cited above), and accordingly, are not further described herein.

According to a preferred embodiment of the invention, an absorption restraint is also utilized in inlet section 20 and outlet section 24 to provide further protection against any potentially harmful leakage of microwave radiation. Thus, jackets 128a,b are disposed around the perimeter of tunnel sections 124, 126, respectively. Jackets 128a,b desirably comprise a microwave transparent inner surface 125a,b and a reflective outer surface 127a,b. Inner surface 125a,b can, for example, be made of glass, or of a polycarbonate resin. Outer surface 127a,b and the sidewalls of jackets 128a,b can be satisfactorily constructed from stainless steel or aluminum. Jackets 128a,b preferably contain a microwave absorptive liquid medium such as water or propylene glycol, which enters jackets 128a,b through inlet ports 130a,b and exits through outlet ports 132a and 132b (not shown). Although not required for all applications, circulation of the microwave absorptive liquid medium assists in cooling tunnel sections 124, 126 and, where water is utilized as the medium, maintaining its temperature below the boiling point.

According to a particularly preferred embodiment of the invention, removable sleeves 134a,b are desirably disposed inside tunnels 124, 126, extending inwardly from the distal ends thereof, through and inwardly adjacent to jackets 128a,b and choke seals 118a,b to the interior walls of cabinet 12 adjacent heating section 22. Sleeves 134a,b are desirably made from a microwave transparent polymeric material such as, for example, polytetrafluoroethylene. The use of removable sleeves 134a,b is not required, but greatly facilitates cleaning the interior portions of tunnel sections 124, 126 and choke seals 118a,b.

According to a preferred embodiment of the invention, inlet section 20 and outlet section 24 further comprise vent pipes 136, 138 for venting excess moisture, smoke, oxidation by-products, grease, fats, and other entrained particulate matter from the interior of thermal treatment apparatus 10. Vent pipes 136, 138 communicate with tunnel sections 124, 126 through ducts 140, 142, respectively, and corresponding perforations in sleeves 134a,b. Alternatively, vent pipes 136, 138 can communicate with tunnel sections 124, 126 through jackets 128a,b, respectively. In either case, consideration should be given to shielding against radiation losses through the vent pipes. Although not shown, it is understood that exhaust fans or vacuum ejectors can be employed in connection with vent pipes 136, 138 to assist in evacuating vapors from the interior portions of the apparatus.

When used in accordance with the method of the invention as described below, the subject apparatus will enable one of ordinary skill in the art to achieve surprising and unexpected results in cooking food products.

According to the method of the invention, food products 62 are placed on web 40 at the distal end of inlet section 20 and are thereafter transported through tunnel section 124 into heating section 22, at which point they initially pass between the first of four alternating and spaced apart waveguides 60 and the first of seven jet fingers 78a,b. Of the seven jet fingers 78a,b, three jet fingers 78a are disposed in alternating relation to the four waveguides 60 above web 40, and four jet fingers 78b are disposed in spaced apart relation, separated by screens 63b, below web 40. Although the particular arrangement of microwave heating devices and jet fingers shown in FIG. 3 is satisfactory for performing the method of the invention, other arrangements of microwave heating devices and jet fingers within heating section 22 may be preferred for use with certain food products.

When food products 62 are subjected to microwave radiation that is directed to them by waveguides 60 from magnetrons 50, the microwaves penetrate to the interior portion of food products 62. Once inside food products 62, the microwaves cause the temperature to rise, and cause water molecules to begin migrating toward the food surface. Microwave heating has proved to be effective for initiating the migration of chemically bound water to the food surface. Once there, the water molecules may either evaporate or remain on the food product, depending upon the equilibrium relative humidity of the atmosphere at the surface.

As used herein, the term "equilibrium relative humidity" refers to the "escaping tendency" of water molecules at the food surface, or said another way, to the "water activity" at the food surface. Studies have shown that the water vapor pressure of a food product can be more responsible than the moisture content of the surrounding air for determining how the product will react or perform during a cooking process. Because the water-vapor pressure at the surface of a food product varies with temperature approximately at the same rate as the saturation water-vapor pressure of air, the equilibrium relative humidity measurement provides the advantage of being roughly independent of temperature over limited temperature ranges.

As shown in FIG. 3, impingement heating is utilized beneath web 40 to begin heating the bottom surface of a relatively thin food product while microwave radiation is applied from the top. Then, as the food product moves beyond the first waveguide 60, the upper surface is subjected to impingement heating from the first jet finger 78a to evaporate moisture that has accumulated at the upper surface and to begin warming and browning that surface. Successive applications of microwave and impingement heating within heating section 22 serve to heat the interior portions of food products 62 to a desired level while simultaneously reducing their moisture content. For thicker food products, it may be desirable to employ microwave heating from both above and below web 40, and either in combination or sequentially.

At the surface of food products 62, the application of impingement heating in combination with means for controlling the moisture content of the temperature-controlled recirculating gas enables the user to continue drying while limiting the surface temperature to a desired level. In this manner, it is possible to continue cooking and drying the interior portions without overcooking or overbrowning the surface. This aspect of the invention is particularly important where the surface of the food product is characterized by small peaks or points (as with the meringue on a cream pie) that typically suffer from localized overheating when subjected to conventionally applied microwave radiation. Furthermore, with the apparatus and method of the present invention, it is possible to utilize the relatively less expensive impingement heating for removing the "easy water" from food products, while restricting the application of the relatively more expensive microwave heating to seeking and removing "chemically bound water" or water from the most moist areas of a food product.

After passing through heating section 22, food products 62 are transported by web 40 through tunnel section 126 of outlet section 24 and are removed from thermal treatment apparatus 10 for subsequent processing, or for cooling, wrapping and storage.

While the present invention has been described herein in relation to its preferred embodiments, various other alterations and modifications will become apparent to the person of ordinary skill in the art upon reading the present disclosure, and it is intended to cover all such alterations or modifications as fall within the scope of the appended claims.

Having described my invention, I claim:

1. Apparatus for thermally treating food products, said apparatus comprising:
a heating section comprising means for supporting a food product; at least one microwave heating means; at least one impingement heating means, said impingement heating means further comprising a plurality of jet fingers adapted to direct a plurality of columnated jets of a temperature controlled gaseous fluid in substantially perpendicular relation against the surface of the food product; and means within the heating section for controlling the equilibrium relative humidity at the surface of the food product so as to avoid localized overheating and overbrowning of the food product; and means for alternately imparting thermal energy to said food products from said microwave heating means and from said impingement heating means.

2. The apparatus of claim 1 wherein said waveguide means comprises walls adapted to permit at least a portion of the temperature controlled gaseous fluid discharged from said impingement heating means to be recirculated therethrough.

3. The apparatus of claim 1 where said microwave heating means further comprises a plurality of microwave generating devices and waveguides for communicating the microwaves generated by said devices to said food products, said waveguides being disposed in spaced apart and alternating relation to a plurality of jet fingers.

4. The apparatus of claim 1, further comprising means for controlling the thermal energy transfer rate from said microwave heating means to said food product.

5. The apparatus of claim 1, further comprising means for controlling the thermal energy transfer rate from said impingement heating means to said food product.

6. The apparatus of claim 4 or claim 5 wherein said control means is a microprocessor.

7. The apparatus of claim 1 wherein said heating section further comprises food product transport means, and at least one impingement heating means disposed above said food product transport means, and at least one impingement heating means disposed below said food product transport means.

8. The apparatus of claim 1, further comprising microwave reflective screen means disposed in substantially parallel relation above and below said food product support means, said microwave reflective screen means being adapted to substantially confine microwave radiation emitted by said microwave heating means between said microwave reflective screen means.

9. The apparatus of claim 1, further comprising a plurality of jet fingers, at least one of said jet fingers being disposed above said food product support means and at least one of said jet fingers being disposed below said food product support means.

10. The apparatus of claim 1, further comprising at least two laterally spaced jet fingers, means for transporting a food product between said jet fingers, and microwave heating means adapted to deliver microwave radiation to said food product as it is transported between said jet fingers.

11. The apparatus of claim 1 wherein said means for controlling the equilibrium relative humidity at the surface of said food product further comprises water supply means, nozzle means adapted to spray water into said temperature-controlled gaseous fluid, valve means adapted to control the flow of water from said water supply means to said nozzle means, solenoid means adapted to control said valve means, sensor means adapted to monitor changes in humidity and temperature of said temperature-controlled gaseous fluid, and relay means adapted to communicate a signal from said sensor means to said solenoid means.

12. Apparatus for thermally treating food products, said apparatus comprising an inlet section, a heating section, an outlet section and means for transporting a food product therethrough, said heating section having at least one microwave heating means and at least one impingement heating means adapted to impart thermal energy to food products transported therethrough, said impingement heating means further comprising a plurality of jet fingers adapted to direct a plurality of columnated jets of a temperature controlled gaseous fluid against the surfaces of said food product; said apparatus further comprising means within the heating section for controlling the equilibrium relative humidity at the surface of the food product so as to avoid localized overheating and overbrowning of said food product.

13. The apparatus of claim 12 wherein said inlet section and said outlet section each further comprises an absorptive restraint system for absorbing microwave radiation, said absorptive restraint system comprising a jacket disposed around the perimeter of said section and having a microwave transparent inner surface, a microwave reflective outer surface, and a microwave absorptive liquid medium disposed therebetween.

14. The apparatus of claim 12 wherein said inlet section and said outlet section each further comprise at least one removable sleeve member.

* * * * *